United States Patent
Hosmer (10) Patent No.: US 8,408,808 B2
(45) Date of Patent: Apr. 2, 2013

(54) TWO-PIECE BEARING CAGE WITH SIDE FACE GREASE CARRYING CAVITIES

(75) Inventor: Christopher E. Hosmer, Greer, SC (US)

(73) Assignee: Baldor Electric Company, Fort Smith, AK (US)

( * ) Notice: Subject to any disclaimer, the term of this patent is extended or adjusted under 35 U.S.C. 154(b) by 705 days.

(21) Appl. No.: 12/632,434

(22) Filed: Dec. 7, 2009

(65) Prior Publication Data

US 2011/0135234 A1 Jun. 9, 2011

(51) Int. Cl.
*F16C 33/38* (2006.01)
*F16C 33/42* (2006.01)

(52) U.S. Cl. ........ 384/523; 384/470; 384/526; 384/531; 384/532; 384/623

(58) Field of Classification Search .................. 384/470, 384/523, 526–532, 617, 623; D15/143
See application file for complete search history.

(56) References Cited

U.S. PATENT DOCUMENTS

| 1,254,332 | A | | 1/1918 | Lindhé |
| 1,712,222 | A | | 5/1929 | Linde |
| 2,861,849 | A | | 11/1958 | Case |
| 3,586,405 | A | * | 6/1971 | Claesson ........................ 384/526 |
| 3,743,369 | A | | 7/1973 | Langström |
| 4,558,961 | A | * | 12/1985 | Fernlund ........................ 384/526 |
| 4,568,206 | A | * | 2/1986 | Imazaike ....................... 384/530 |
| 4,626,113 | A | | 12/1986 | Forknall et al. |
| 4,732,496 | A | | 3/1988 | Shail |
| 4,902,145 | A | * | 2/1990 | Johnson ......................... 384/470 |
| D323,837 | S | * | 2/1992 | Johnson ....................... D15/143 |
| 6,799,896 | B2 | | 10/2004 | Meeker et al. |
| 7,507,028 | B2 | | 3/2009 | Markle |
| 7,703,986 | B2 | * | 4/2010 | Naito .............................. 384/526 |
| 2002/0126927 | A1 | * | 9/2002 | Compassi ...................... 384/470 |
| 2007/0230849 | A1 | * | 10/2007 | Naito .............................. 384/530 |

FOREIGN PATENT DOCUMENTS

| JP | 2006226430 A | * | 8/2006 |
| JP | 2006258166 A | * | 9/2006 |
| JP | 2006258172 A | * | 9/2006 |

* cited by examiner

*Primary Examiner* — Marcus Charles
(74) *Attorney, Agent, or Firm* — Thompson Coburn LLP (57) ABSTRACT

A retainer portion of a cage of a bearing has a plurality of spokes and web sections extending between an outer ring section and an inner ring section with a plurality of cavities formed on an annular side face of the retainer portion. The cavities communicate with socket portions formed in the retainer portion to provide lubrication to rotational elements of the bearing. A latch and catch mechanism secures like retainer portions together to form a cage of the bearing.

27 Claims, 9 Drawing Sheets

TWO-PIECE BEARING CAGE WITH SIDE FACE GREASE CARRYING CAVITIES

BACKGROUND AND BRIEF SUMMARY OF THE INVENTION

The following disclosure relates to a bearing cage, primarily for a ball bearing assembly, with retainer portions that snap together to form the cage of the bearing assembly. Each retainer portion has cavities formed in a side face adapted for carrying lubricant for the rotational elements disposed in the assembled bearing cage. The cavities provide a compartmentalized arrangement for the assembled bearing cage that allows lubricant to be retained in the cavities of the retainer portions making it difficult for the lubricant to be washed out when the bearing is used in a high-pressure or wash-down application. The arrangement of the cage when assembled, and the grease in the cavities of the cage, forms a seal for the bearing by filling the annular area between the inner and outer rings on both sides of the bearing.

BRIEF DESCRIPTION OF THE DRAWINGS

Further detail of the disclosed embodiments follows in the detailed description below and is shown in the accompanying drawings wherein.

DETAILED DESCRIPTION

Figure 1:
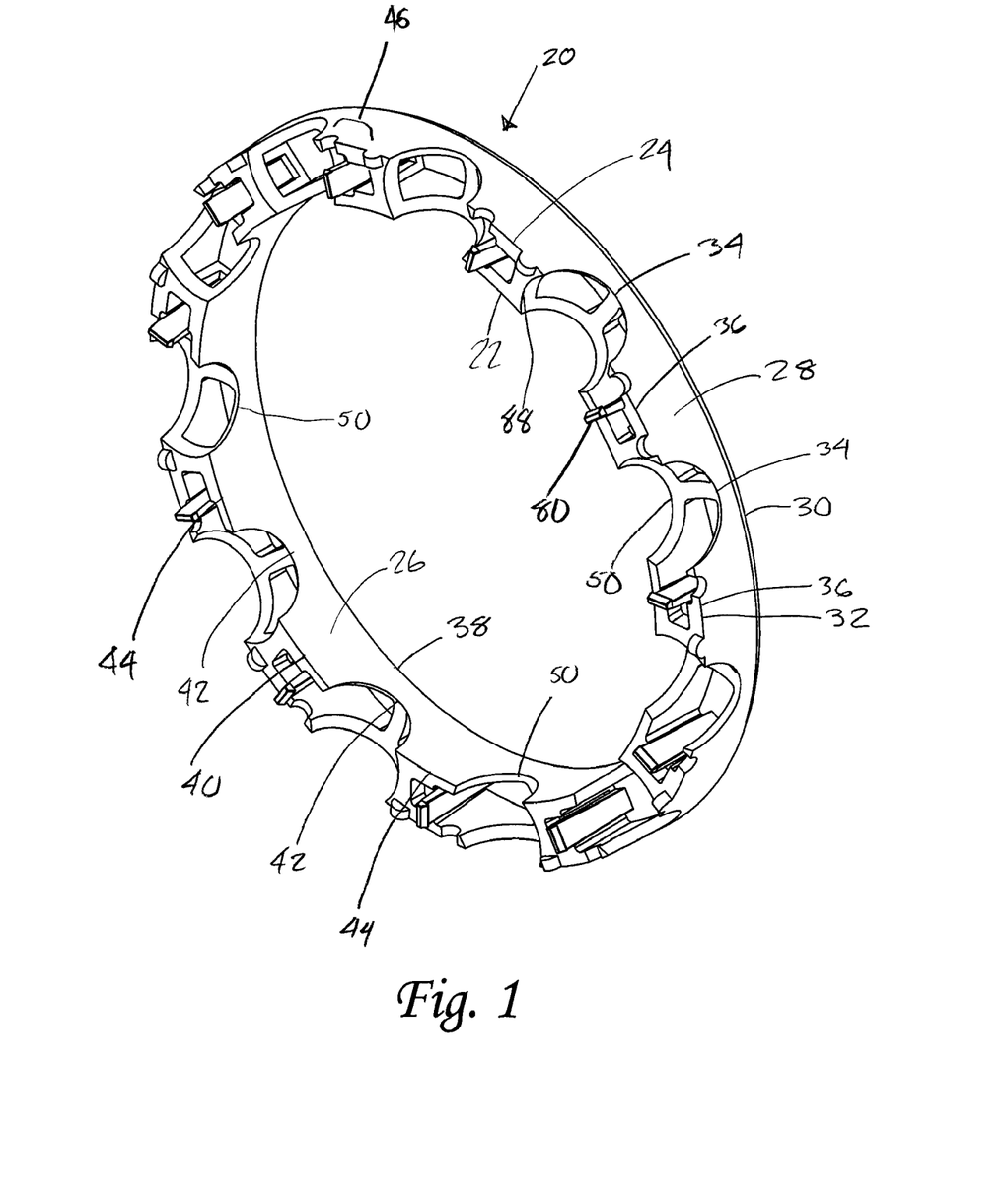
FIG. 1 is a first perspective view of one embodiment of a retainer portion, two of which may be snapped together to form a cage of a bearing as shown in FIG. 12.
Figure 2:
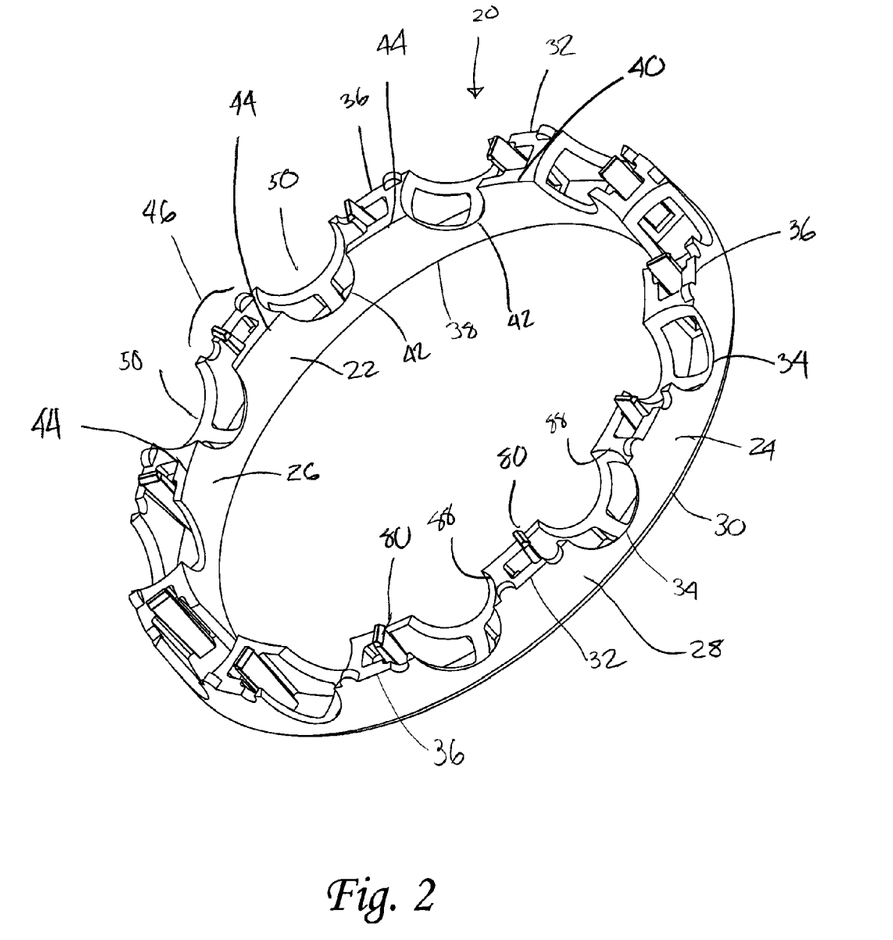
FIG. 2 is a second perspective view of the retainer portion of FIG. 1.
Figure 3:
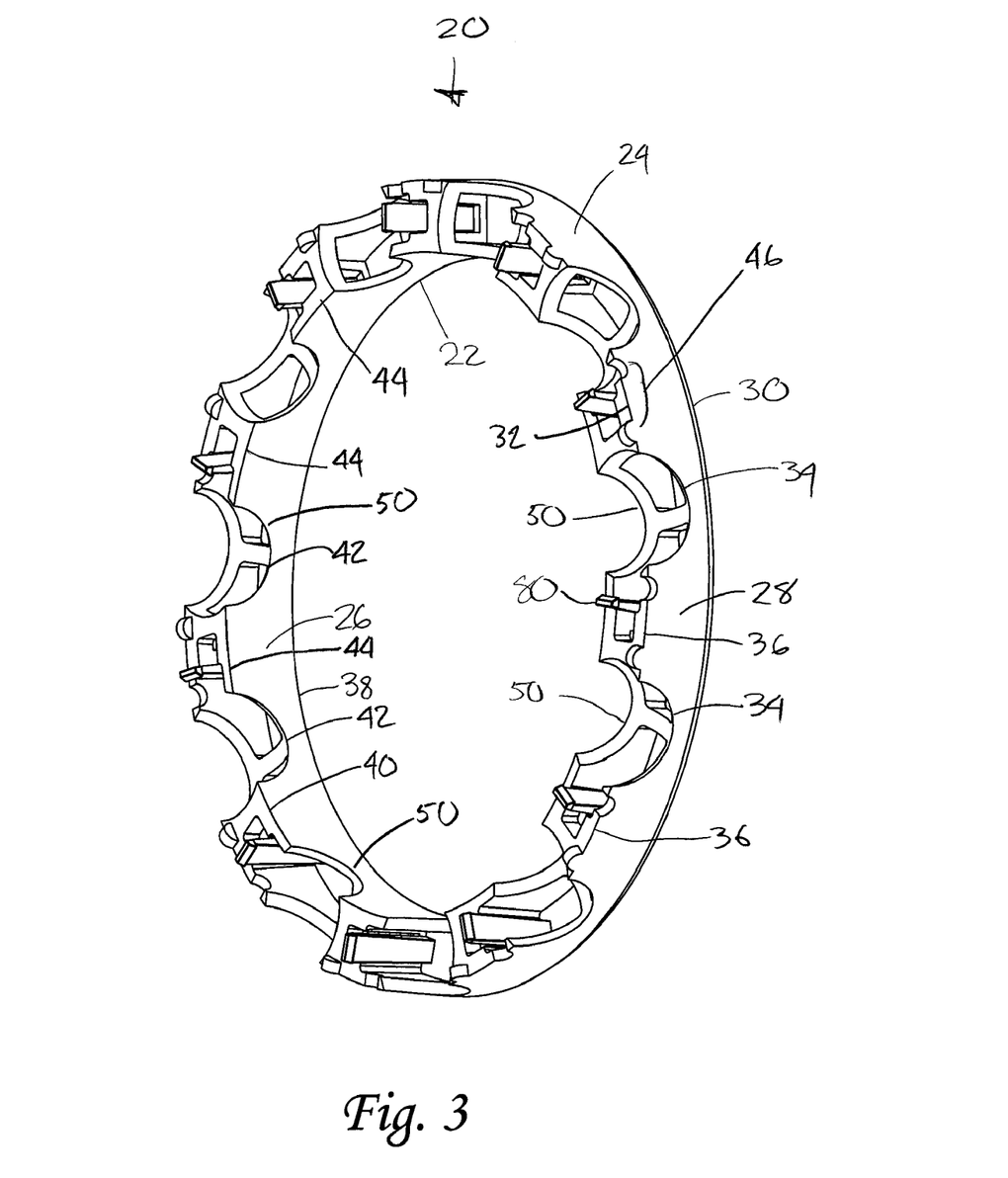
FIG. 3 is a third perspective view of the retainer portion of FIG. 1.

FIGS. 1-11 show one retainer portion 20 used to form a cage of the bearing assembly. As will become more evident from the description that follows, two identical retainer portions are preferably aligned and brought into register to form a cage of the bearing assembly (FIGS. 12-15). Only one retainer portion will be described in detail as two like retainer portions are assembled to form a cage of the bearing assembly. As best shown in FIGS. 1-3, the retainer portion 20 comprises an inner ring section 22 and an outer ring section 24 concentrically disposed about the inner ring section. Each of the inner and outer ring sections 22,24 has a cylindrical surface 26,28. The outer ring section cylindrical surface 28 has a generally annular side edge 30, and opposite the annular side edge, the outer ring cylindrical surface is provided with a formed or shaped edge 32 having a repeating form comprising a series of alternating arcuate cut-outs 34 and lands or flats 36. The inner ring section cylindrical surface 26 also has a generally annular side edge 38, and opposite the annular side edge, the inner ring section is provided with a formed or shaped edge 40 having a repeating form, also comprising a series of alternating arcuate cut-outs 42 and lands 44. Preferably, an interlocking key 46 is provided on the lands or flats 36 of the outer ring section cylindrical surface 28. Although not shown in the drawings, the formed edge of the inner ring section cylindrical surface may include an interlocking key. The repeating forms of the inner ring and outer ring sections are aligned so that the arcuate cut-outs 34,42 of the outer ring section and the inner ring section are radially aligned to form a plurality of socket portions 50. Preferably, each of the socket portions 50 is equiangularly spaced about the retainer portion. The retainer portion shown in the figures has 11 socket portions. However, there may be more or less socket portions, or there may be an odd or even number of socket portions depending upon the application and bearing design criteria. Although the arcuate cut-outs 34,42 forming the socket portions 50 of the retainer portions are adapted for use with spherical rotational elements, the inner and outer ring section formed edges 32,40 may be arranged with a geometry suitable for other rotational elements, for instance, cylindrical elements may also be used. As will become evident in the discussion that follows below, a retainer portion having the construction described below may be mated with a like retainer portion to form a cage regardless of the number of socket portions incorporated into the bearing design.

Figure 4:
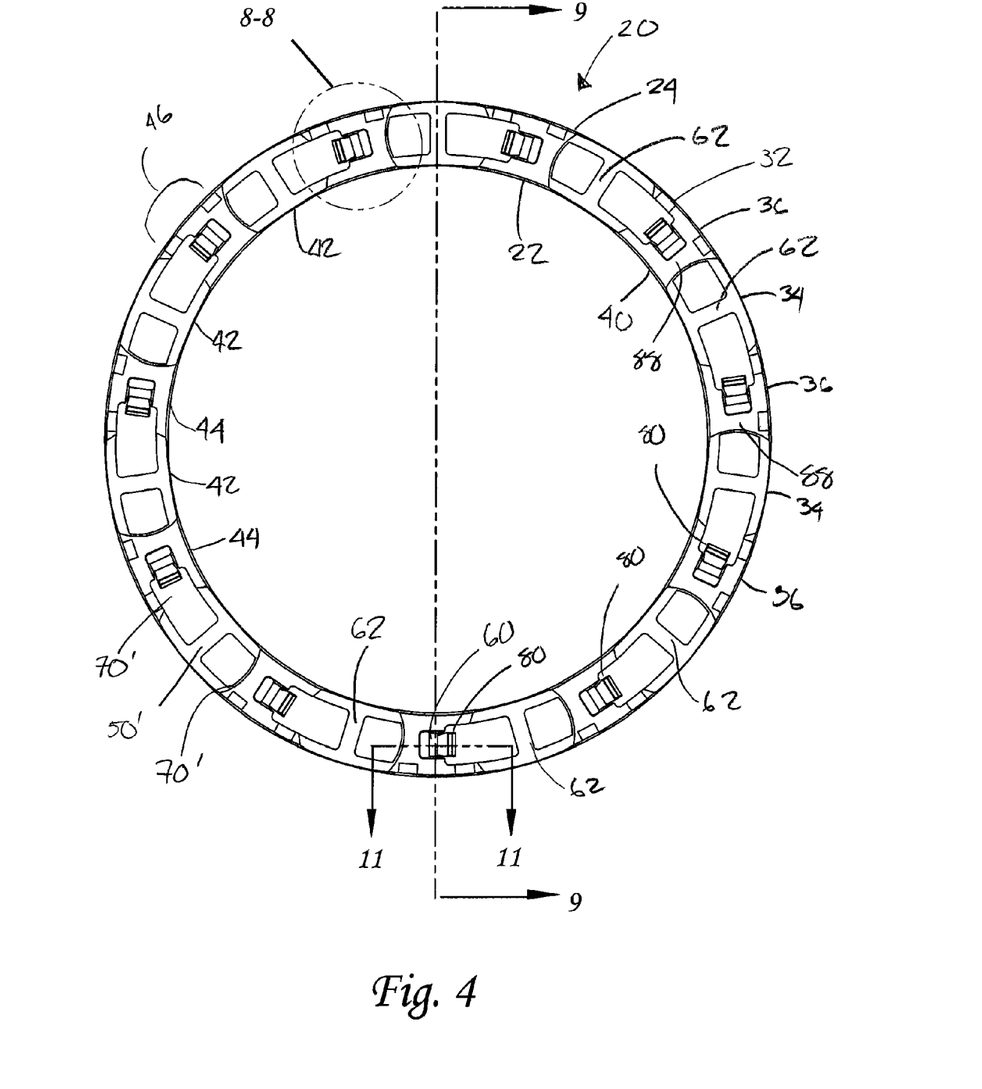
FIG. 4 is a top view of the retainer portion of FIG. 1 with latches and socket portions of the retainer portion in view.
Figure 5:
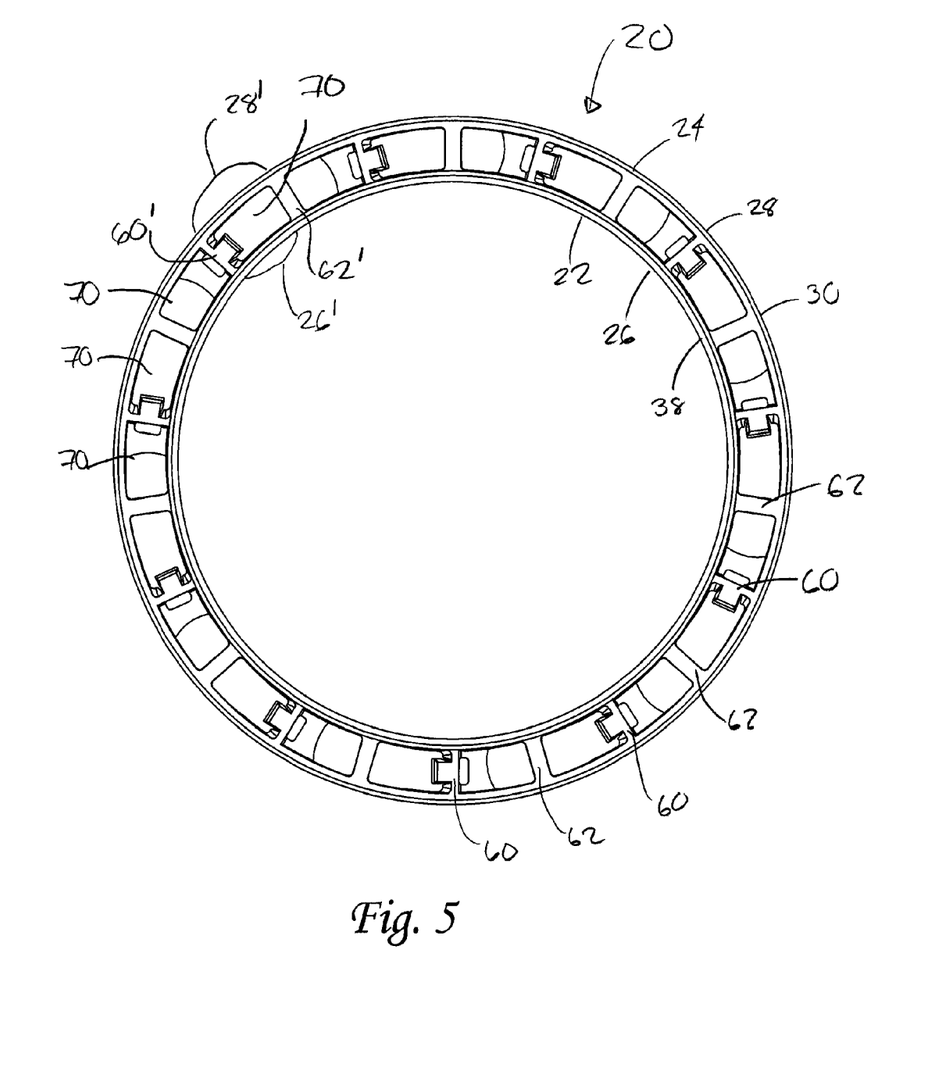
FIG. 5 is a bottom view (i.e., a view opposite that of FIG. 4) of the retainer portion of FIG. 1 with annular inner and outer side edges of the retainer portion in view.
Figure 6:
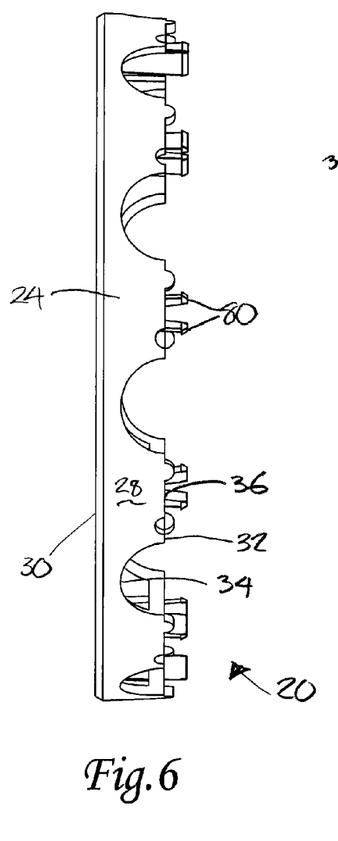
FIG. 6 is a left side view of the retainer portion of FIG. 1 (a right side view is not shown being a mirror image of the view of FIG. 6)
Figure 7:
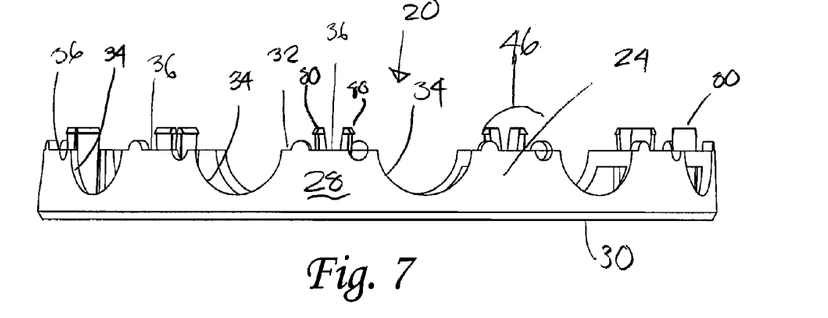
FIG. 7 is a front view of the retainer portion of FIG. 1 (a rear view is not shown being a mirror image of view of FIG. 7)

As best shown in FIGS. 4 and 5, the outer ring section 24 is concentrically disposed about the inner ring section 22, and a plurality of spokes extend radially between the inner ring and outer ring sections 22,24. The spokes maintain the inner and outer ring sections in a set concentric spacing. As will be described below in greater detail, a portion of the spokes are used for mating like retainer portions together and a portion of the spokes are used to provide structural integrity for the assembly. For the illustrative purposes only in the discussion that follows below and not in any limiting sense, the spokes used for mating like retainer portions together will be referred to as latching spokes 60, and the spokes not used for mating like retainer portions together but used primarily for enhancing the structural integrity of the assembly will be referred to as web section spokes 62. As shown in the drawings, the latching spokes are equiangularly spaced about the retainer portion, and the web section spokes are equiangularly spaced about the retainer portion with the web section spokes disposed equiangularly between the latching spokes. However, the arrangement and number of latching spokes and web section spokes may vary depending upon the size of the retainer portion. For instance, for a small diameter retainer portion, web section spokes may be omitted. For the retainer portion of the drawings, the web section spokes are disposed in the center of the socket portions, and the latching spokes are centered between the lands or flats between adjacent socket portions. However, additional web section spokes may be incorporated into the retainer portion as needed. As shown in the drawings, the latching spokes are also be aligned with the interlocking keys provided on the flats or lands of the outer ring section cylindrical surface. However, other arrangement may be used. Preferably, the spokes and the inner and outer ring sections are monolithically formed. For instance, the retainer portion may be formed from a resilient plastic material and injection molded in the form shown in the drawings. As will be explained below, two like retainer portions may then be fitted with rotational elements therebetween and snapped together to form a cage of a bearing.

A plurality of cavities 70 are provided in the retainer portion. Specifically, for illustrative purposes only, referring to FIG. 5, a latching spoke 60' and a web section spoke 62', and respective portions of the inner ring section cylindrical surface 26' and the outer ring section cylindrical surface 28' extending therebetween thereby define a cavity 70. Each of the cavities 70 communicates with a socket portion 50. As best shown in FIG. 4, two cavities 70' communicate with one socket 50', although other arrangements of spokes and web sections may be provided to define the cavity. Each cavity 70 maintains grease or lubricant in the retainer portion and thus the cage of the bearing under varying load conditions. By forming the cavities in communication with the socket portions, the rotatable elements are more consistently in contact with grease or lubricant, thus enhancing the film layer surrounding the rotatable element, which in turn minimizes wear, friction, and heat. The web section spokes and latching spokes assist in retaining grease or lubricant in the cavity, thereby reducing the amount of grease or lubricant expelled axially from the cavity opening and flowing axially and tangentially from the openings of the cavities during operation of the bearing. However, the spacing between the spokes allows grease or lubricant to be initially deposited in the cavities. By retaining grease in the cavities, relative motion between the grease and retainer portions is minimized. The grease in the cavities rotates with the bearing cage as the bearing cage rotates between the inner and outer bearing raceways. The overall effect contributes to an enhanced film layer between the bearing race and the rotational elements, ensuring the rotational elements are adequately covered with grease.

Figure 8:
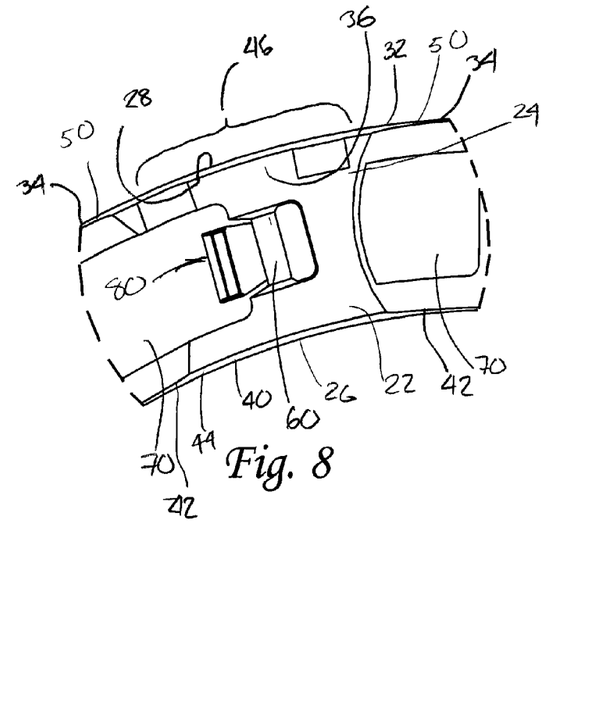
FIG. 8 is an enlarged sectional view of a latch and a socket portion of the retainer portion of FIG. 1 taken from detail area 8-8 of FIG. 4.
Figure 9:
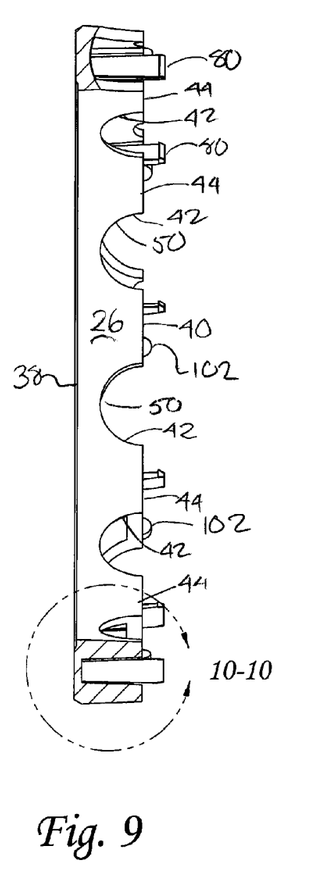
FIG. 9 is a side cross-sectional view of the retainer portion of FIG. 1 taken along lines 9-9 of FIG. 4.
Figure 10:
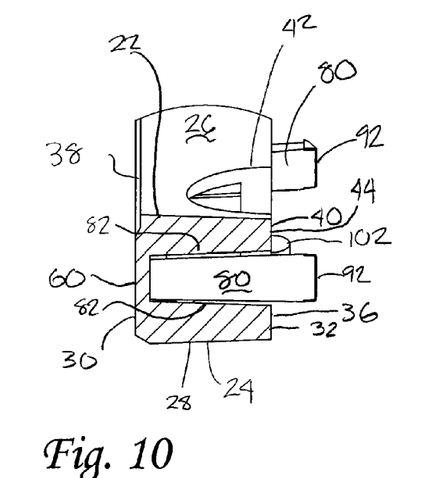
FIG. 10 is an enlarged cross-sectional view of a latch and a spoke from detail area 10-10 of FIG. 9.

As best shown in FIGS. 8, 9, 10, and 11, each latching spoke has a latch 80 for securing or snap fitting like retainer portions together. Preferably, the latch 80 has a cantilever connection with the latching spoke 60 to allow the latch to deflect slightly in the circumferential direction as may be required during assembly of the like retainer portions to form the cage. The latch 80 may also be formed monolithically with the spoke. As shown in FIGS. 8, 9, 10, and 11, the latch 80 projects axially away from the formed edges 32,40 of the inner ring section 22 and the outer ring section 24 in the space between the inner ring section and the outer ring section. Referring to FIG. 8, the latch is disposed adjacent a radial side of the socket portion. Although the drawings show each socket portion with a latch on a radial side of the socket portion, one or more latches may be omitted. In other words, it is not necessary that each socket portion have a latch. As mentioned previously, a portion of the spokes may be provided with latches (i.e., latching spokes 60) and a portion of the spokes perform as web section spokes 62 linking the inner and outer ring sections together. The inner and outer ring sections 22,24 may be provided with an increased radial thickness area 82 (FIGS. 10, 11) projecting inward in the space between the inner and outer ring sections adjacent any spoke supporting a latch to provide reinforcement.

Across the socket portion from the latch in the circumferential direction, a chord portion 88 is provided for securing or snap fitting like retainer portions together. The chord portion extends generally radially between the inner ring section 22 and the outer ring section 24 rimming or defining a radial edge portion of the socket portion 50, and forming a catch for engaging a latch of a mating retainer portion, as will be described in greater detail below. As shown in the drawings, the chord portion 88 together with the arcuate cut-outs 42 of the inner ring section, the arcuate cut-outs 34 of the outer ring section, and the web section spoke 62 form a bearing surface for the socket portion. The chord portion also assists in retaining grease or lubricant in the cavities. The alternating arrangement of latches 80 and chord portions 88 on opposing radial edges of the socket portion 50 allows like retainer portions to be used regardless of the number of socket portions and rotational elements disposed in the cage.

Figure 11:
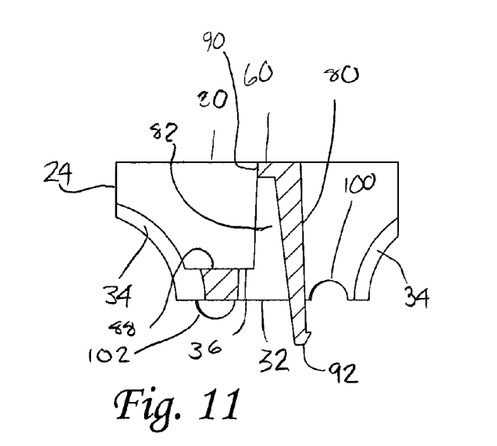
FIG. 11 is an enlarged cross-sectional view of a latch and socket taken along lines 11-11 of FIG. 4.
Figure 12:
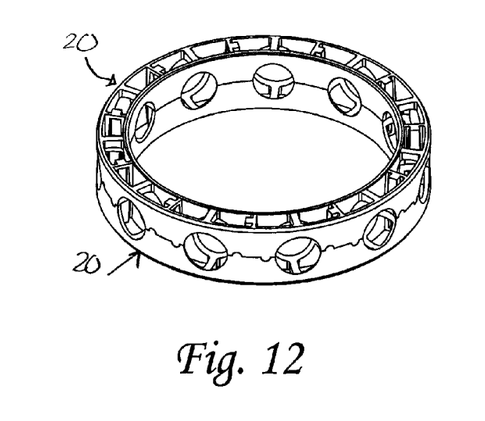
FIG. 12 shows two like retainer portions brought into register to form a cage for a bearing.
Figure 13:
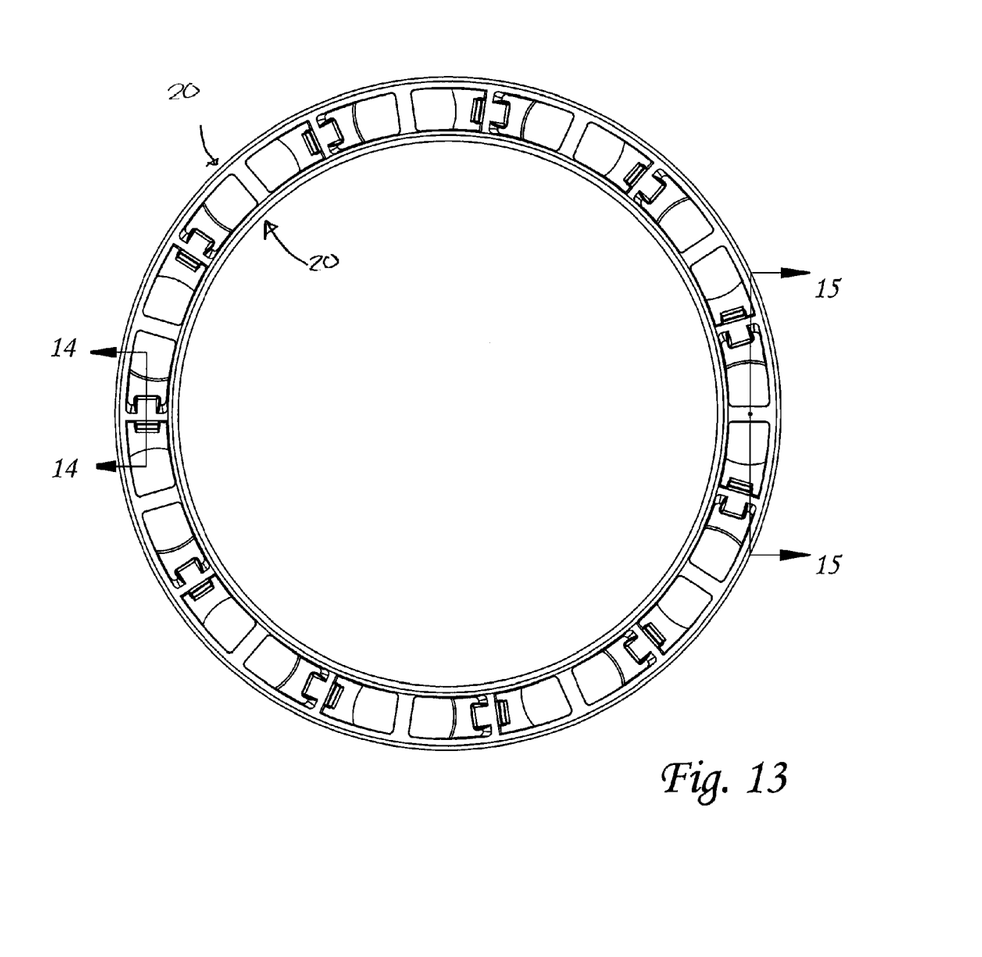
FIG. 13 is a plan view of the cage of FIG. 12 assembled using two retainer portions of FIG. 1.
Figure 14:
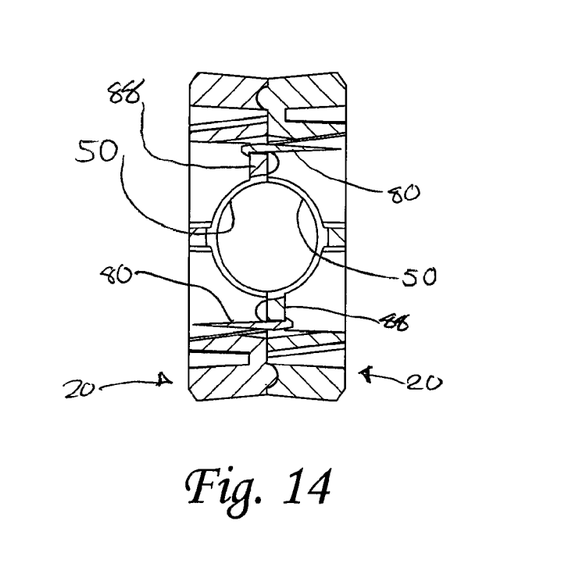
FIG. 14 is an enlarged cross-sectional view of engaged retainer portions taken along lines 14-14 of FIG. 13.
Figure 15:
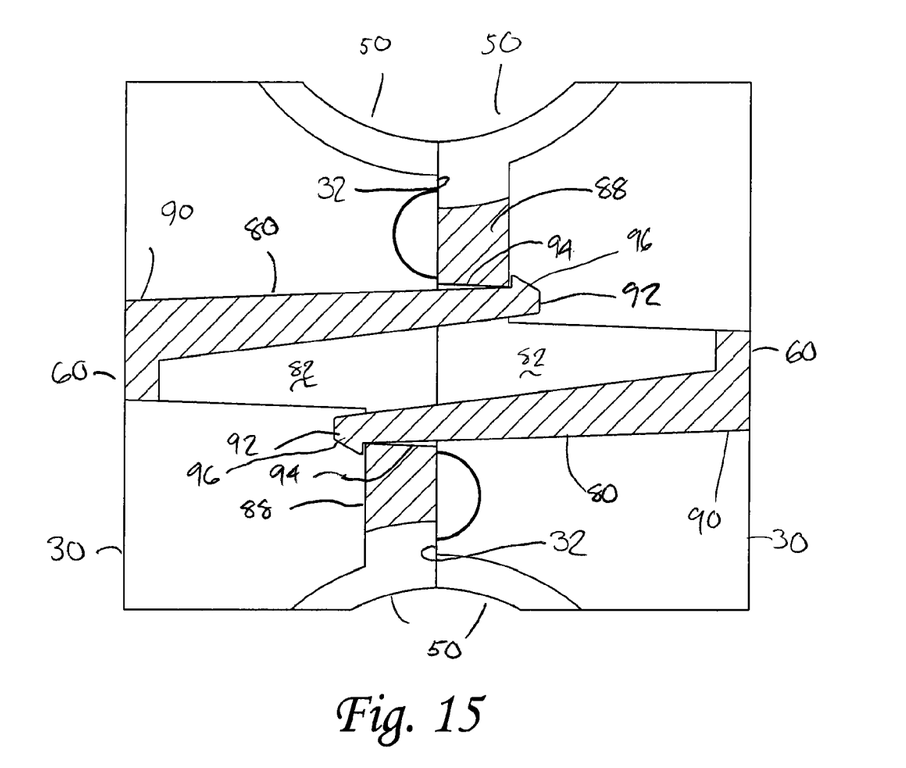
FIG. 15 is an enlarged cross-sectional view of engaged retainer portions taken along lines 15-15 of FIG. 13.

Referring to FIGS. 11, 14, and 15, a proximal end 90 of the latch 80 has a cantilevered connection with a side face of the latching spoke 60, and a distal end 92 of the latch is shaped to slide on and then engage the chord portion 88 of a mating retainer portion during assembly of the retainer portions. The distal end 92 has a generally triangular shaped head that slides along the top and side portion 94 of the chord portion 88 during engagement of the latch 80 with the chord portion and a tang 96 that catches an underside of the chord portion. The dimension between the tang and the formed edges of the inner and outer ring sections corresponds to the thickness of the chord portion, thus allowing the latch to engage the chord portion of the mating retainer portion and hold the two together with sufficient tightness and with a minimal gap between adjacent formed edges of the retainer portions. The cantilever-type connection between the latch and the latching spoke allows the latch to deflect as may be necessary when the triangular head abuts the chord portion, allowing the latch to engage the chord portion of the mating retainer portion during assembly of the cage. Although the drawings show a latch and chord portion adjacent each socket portion of the retainer portion, the latch and/or chord portion may be omitted from one or more socket portions and yet provide sufficient structural integrity of the assembled cage.

To provide additional latching force between mating retainer portions, the latch may be biased against the chord. For instance, the latch's cantilevered connection to the latching spoke on a side of the spoke may allow the latch to be slightly offset from the latching spoke in the circumferential direction. Thus, as the two retainer portions are brought together in register, the first retainer portion may be rotated slightly relative to the second retainer portion to slightly deflect each respective retainer portion's latch to engage its associated chord portion. In this arrangement, the latch of the first retainer portion may be deflected in a first rotary direction as it engages the chord portion of the second retainer portion and the latch of the second retainer portion may be deflected in a second rotary direction opposite the first rotary direction as the latch of the second retainer portion engages the chord portion of the first retainer portion. The arrangement allows the latches to be slightly urged against the chord portions to assist in maintaining the mating retainer portion together. The latch may also project in the circumferential direction as it extends away from the spoke to provide the necessary offset for biasing the latch into engagement with the chord portion.

To maintain engagement of the retainer portions, the anti-rotational feature 46 and/or interlocking key is provided. As shown in the drawings, the anti-rotational feature 46 of the retainer portion comprises a notch 100 circumferentially spaced from a detent 102 on the formed edge of the outer ring section. The notch of the first retainer portion receives a detent of the second mating retainer portion, and the notch of the second retainer portion receives the detent of the first retainer portion. Preferably, the notch and detent are provided on the lands or flats, and thus, equiangularly spaced between the adjacent socket portions and/or aligned with the spokes. The anti-rotational feature, together with the latch and cord mechanism, locks the retainer portions together and prevents relative rotation therebetween thereby maintaining the latches engaged with the chord portions. Preferably, the interlocking key has features that enable rotary motion between the retainer portions to guide the latch and chord portions into engagement. For instance, the detent and notch may be rounded to allow them to be guided into engagement, thereby facilitating engagement of the retainer portions.

While specific embodiments have been described in detail in the foregoing detailed description and illustrated in the accompanying drawings, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A retainer portion of a cage for a bearing, comprising: concentric inner and outer ring sections each having a cylindrical surface with an annular side edge, the outer ring section being separated from an inner ring section with a plurality of spokes extending radially therebetween, the plurality of spokes and respective portions of the annular side edges of the inner and outer ring sections bounded thereby defining a plurality of cavities of the retainer portion, the inner ring section cylindrical surface having a plurality of arcuate cut-outs extending through an edge opposite the inner ring section annular side edge, the outer ring section having a plurality of arcuate cut-outs extending through an edge opposite the outer ring section annular side edge, the arcuate cut-outs of the inner ring and outer ring cylindrical surfaces being radially aligned to form a plurality of socket portions each adapted to at least in part receive a rotational element of the bearing, each socket portion communicating with a cavity, at least one of the socket portions being defined in part by a chord portion extending generally radially between the inner ring section and the outer ring section to form a radial side of the socket portion, at least one of the spokes having a latch projecting axially from the side face between the inner ring section and outer ring section circumferentially adjacent the at least one socket portion across from the chord portion, and the outer ring cylindrical surface having an interlocking key opposite the outer ring annual side edge.

2. The retainer of claim 1 wherein the spokes, the inner and outer ring sections, the at least one latch, and the at least one chord portion are monolithically formed.

3. The retainer of claim 1 wherein the interlocking key is super-circumjacent the latch.

4. The retainer of claim 1 wherein each socket portion of the plurality of socket portions has a chord portion.

5. The retainer of claim 1 wherein each socket portion of the plurality of socket portions has a latch positioned circumferentially adjacent thereto.

6. The retainer of claim 1, wherein a portion of the plurality of the spokes are formed with latches.

7. The retainer of claim 1, wherein the plurality of the socket portions each has a center and a portion of the plurality of the spokes are radially aligned with the socket portion centers.

8. The retainer of claim 1, wherein the spokes are equiangularly spaced about the inner and outer ring sections.

9. The retainer of claim 1, wherein the retainer is symmetrical about its centerline.

10. A cage for rotational elements of a bearing, comprising: first and second like retainer portions each comprising concentric inner and outer ring sections, the inner and outer ring sections each having a cylindrical surface with an annular side edge, the outer ring section being separated from an inner ring section with a plurality of spokes extending radially therebetween, the plurality of spokes and respective portions of the annular side edges of the inner and outer ring sections bounded thereby defining a plurality of cavities of each retainer portion, each retainer portion inner ring section cylindrical surface having a plurality of arcuate cut-outs extending through an edge opposite the inner ring section annular side edge, each retainer portion outer ring section having a plurality of arcuate cut-outs extending through an edge opposite the outer ring section annular side edge, the arcuate cut-outs of the inner ring and outer ring cylindrical surfaces of each retainer portion being radially aligned to form a plurality of socket portions, each retainer portion socket portion communicating with a cavity, at least one of the socket portions of each retainer portion being defined by a chord portion extending generally radially between the inner ring section and outer ring section to form a radial side of the socket portion, the chord portion forming a catch, at least one of the spokes of each retainer portion having a latch projecting axially between the inner ring section and outer ring section circumferentially adjacent the at least one socket portion across from the chord portion, the latch of the first retainer portion engaging the catch of the second retainer portion and the latch of the second retainer portion engaging the catch of the first retainer portion in a manner to secure the retainer portions together to form the cage with the socket portions of each retainer portion being in register and forming a socket adapted to receive a rotational element of the bearing.

11. The cage of claim 10, wherein the spokes, the inner and outer ring segments, the at least one latch, and the at least one chord portion of each retainer portion are monolithically formed.

12. The cage of claim 10, wherein each socket portion of the plurality of socket portions of each retainer portion has a chord portion.

13. The cage of claim 10, wherein each socket portion of the plurality of socket portions of each retainer portion has a latch positioned adjacent thereto.

14. The cage of claim 10, further comprising an interlocking key on the outer cylindrical surface of each retainer portion.

15. The cage of claim 14, wherein the interlocking key comprises a detent and notch formed on each retainer portion.

16. The cage of claim 15, wherein the detents of the first and second retainer portions engage the notches of the first and second retainer portions as the latches of first and second retainer portions engage the catches of the first and second engagement portions.

17. The cage of claim 14, wherein the interlocking key prevents rotation of the first and second retainer portions.

18. The cage of claim 10, wherein a portion of the plurality of spokes of each retainer portion are formed with latches.

19. The cage of claim 10, wherein the plurality of socket portions of each retainer portion each has a center and a portion of the plurality of the spokes of each retainer portion are radially aligned with socket portion centers.

20. The cage of claim 10, wherein the spokes are equiangularly spaced about the inner and outer ring sections of each retainer portion.

21. The cage of claim 10, wherein the retainer portions are symmetrical about their center axes.

22. The cage of claim 10, wherein a portion of the plurality of the spokes of each retainer are positioned relative to the cavities to restrict an axial flow of lubricant out of the cavities.

23. The cage of claim 10, wherein a portion of the plurality of the spokes of each retainer are positioned relative to the cavities to allow lubricant to be deposited in the cavities and to hold lubricant in the cavities during operation of the bearing in which the cage is installed.

24. A cage for a bearing comprising:
a first retainer portion comprising:
 a plurality of socket portions each adapted to in part receive a rotational element of the bearing, at least one of the socket portions having a latching member adjacent a first radial edge of the socket portion and a catching member adjacent a second radial edge of the socket portion, the first radial edge being across the socket portion from the second radial edge, and
 at least one antirotational interlock formed between at least two of the socket portions;
 a plurality of cavities formed on an annular side face of the retainer portion communicating with each of the socket portions;
and
a second retainer portion comprising:
 a plurality of socket portions each adapted to in part receive a rotational element of the bearing, at least one of the socket portions having a latching member adjacent a first radial edge of the socket portion and a catching member adjacent a second radial edge of the socket portion, the first radial edge being across the socket portion from the second radial edge; and
 at least one antirotational interlock formed between at least two of the socket portions;
 a plurality of cavities formed on an annular side face of the retainer communicating with each of the socket portions;
wherein as the at least one antirotation interlock of the first retainer portion is engaged with the at least one antirotation interlock of the second retainer portion, the latching member of the at least one socket portion of the first retainer portion engages with the catching member of the at least one socket portion of the second retainer, and the latching member of the at least one socket portion of the second retainer portion engages with the catching portion of the at least one socket portion of the first retainer portion in a manner to secure the first and second retainer portions together.

25. The cage of claim 24, wherein the at least one antirotational interlock of the first and second retainer portions is formed on an outer cylindrical surface of the respective retainer portions.

26. The cage of claim 25, where in the at least one antirotational interlock of the first and second retainer portions comprises a detent and notch on the outer cylindrical surface of the respective retainer portions.

27. The cage of claim 26, wherein the detents of the first and second retainer portions engages the notches of the first and second retainer portions as the at least one antirotation interlock of the first retainer portion is engaged with the at least one antirotation interlock of the second retainer portion.

* * * * *